United States Patent [19]

Korhonen et al.

[11] Patent Number: 5,296,028
[45] Date of Patent: Mar. 22, 1994

[54] ANTIFREEZE ADMIXTURE FOR CONCRETE

[75] Inventors: Charles J. Korhonen, Etna, N.H.; Edel R. Cortez, N. Thetford, Vt.

[73] Assignee: The United States of America as represented by the Secretary of the Army, Washington, D.C.

[21] Appl. No.: 59,395

[22] Filed: May 11, 1993

[51] Int. Cl.$^5$ .............................................. C04B 22/14
[52] U.S. Cl. ................................... 106/815; 106/818; 106/819; 106/736; 264/333; 264/DIG. 43
[58] Field of Search ............... 106/818, 819, 736, 815; 264/333, DIG. 43

[56] References Cited

U.S. PATENT DOCUMENTS

| | | | |
|---|---|---|---|
| 409,397 | 8/1889 | Garrell | 106/819 |
| 3,179,528 | 4/1965 | Holmgren et al. | 106/649 |
| 3,891,454 | 6/1975 | Cunningham et al. | 106/719 |
| 3,937,282 | 2/1976 | Shryock et al. | 106/719 |
| 4,045,236 | 8/1977 | Bianchi | 106/678 |
| 4,256,500 | 3/1981 | Turpin, Jr. | 106/679 |
| 5,176,753 | 1/1993 | Brook | 106/819 |

FOREIGN PATENT DOCUMENTS 808443 2/1981 U.S.S.R. ................... 106/818

*Primary Examiner*—Anthony Green
*Attorney, Agent, or Firm*—Luther A. Marsh

[57] ABSTRACT

A method and composition for making concrete includes an antifreeze admixture which is added to the concrete to prevent the freezing of water in the concrete when the concrete is cured during the winter or other cold conditions. The concrete admixture includes sodium nitrate and sodium sulfate combined with one another in a predetermined ratio. In a preferred a embodiment the ratio of sodium nitrate to sodium sulfate equals 3:1. A dosage of greater than 2% by weight of cement of the above described admixture was found to significantly increase the compressive strength of concrete cast of cold (below freezing, or 0 degrees celsius) temperatures, and dosages of 6% and 8% by weight of cement of the specified admixture were found to be particularly effective.

4 Claims, No Drawings

ANTIFREEZE ADMIXTURE FOR CONCRETE

The present invention pertains to a method and composition for curing concrete in cold temperature environment. The method includes the use of an antifreeze admixture which is added to the mix to foster strength development when the concrete is cured during the winter or other cold conditions.

BACKGROUND OF THE INVENTION

Concrete that contains no admixtures and that is cured during the winter or other cold conditions can be superior in strength to concrete that is cured during the summer or otherwise relatively warm conditions. This superiority can be achieved only if the concrete is protected from freezing.

Current winter protection techniques entail some form of heat to maintain the temperature of the concrete above freezing until it has developed sufficient strength to resist frost damage and to support structural loads. This adds time and expense to concreting operations.

It would be desirable to cast concrete in such a fashion that the need for external application of heat protection would be reduced or eliminated, while still preventing a portion or all of the water in the curing concrete from freezing, as well as inducing the cement to hydrate at a much faster rate that it normally would at a low temperature. It is noted that such low temperature concrete would be useful during the winter in temperate climates as well as during other cold conditions such as are experienced during the entire year in colder climates.

SUMMARY OF THE INVENTION

It is a primary objective of the present invention to provide a concrete admixture and method of curing concrete which will prevent all or a portion of the water in the curing concrete from freezing, as well as inducing the cement to hydrate at a much faster rate than it normally would at low temperature.

It is also an objective of the present invention to provide such an admixture and concrete curing method which decreases or eliminates the need the thermal protection during curing at low temperatures.

A further object of the invention is the provision of a concrete admixture and method of casting concrete which significantly reduces winter concreting costs.

The above and other objects of the invention which will become apparent hereinafter are achieved by the provision of a method of casting concrete and a concrete admixture in which sodium nitrate and sodium sulfate are combined with one another in a predetermined ratio. In a preferred embodiment of the invention, the ratio of sodium nitrate to sodium sulfate equals 3:1. A dosage of greater than 2% by weight of the above-described admixture was found to significantly increase the compressive strength of concrete cast at low (below freezing, or 0 degrees Celsius) temperatures, and dosages of 6% and 8% by weight of thee specified admixture were found to be particularly effective.

For a more complete understanding of the invention and the objects and advantages thereof, reference should be had to the following detailed description wherein preferred embodiments of the invention are described.

DESCRIPTION OF THE PREFERRED EMBODIMENTS

As described above, the present invention includes a method and composition for making concrete and, more particularly, to such concrete to which an antifreeze admixture is added to prevent the freezing of water added to the concrete when the concrete is cast during the winter or other cold conditions. According to the invention, the method of casting concrete includes dosing a known concrete mixture, such as Portland cement, with a concrete admixture in which sodium nitrate and sodium sulfate are combined with one another in a predetermined ratio.

In a preferred embodiment of the invention, the ratio of sodium nitrate to sodium sulfate equals 3:1. A dosage of greater that 2% by weight of the above-described admixture was found to significantly increase the compressive strength of concrete cast at low (below freezing, or 0 degrees Celsius) temperatures, and dosages of 6% and 8% by weight of the specified admixture were found to be particularly effective.

The invention will be illustrated with reference to the following examples.

EXAMPLE 1

A number of concrete mixes were prepared according to standard methods and allowed to harden at +20° C. The compressive strength, measured in pounds per square inch (psi) of each of the mixes was determined at 7-day, 14-day, and 28-day intervals. The results of these tests are summarized in the accompanying table 1. Referring to table 1, a control mix, of standard Portland cement, identified as Mix No. 1, contained no admixture. The compressive strength of the control mix was 5603 psi at 28 days. Three mixes containing the admixture in accordance with the invention, i.e., sodium nitrate to sodium sulfate in a ratio equal to 3:1 by weight (identified in the Table as KC1) were prepared in dosages of, respectively 2%, 6%, and 8% by weight of cement added to the control mix. These three mixes are identified in the table as Mix Nos. 18, 19 and 20, respectively, and had compressive strenghts of 5588, 5883 and 5949 psi, respectively at 28 days. As is thus seen, there was no disadvantageious effects of the admixture dosed concrete when hardened at a temperature above freezing.

TABLE 1

| | | CURING TEMPERATURE: +20° C. | | |
|---|---|---|---|---|
| MIX | | COMPRESSIVE STRENGTH (psi) | | |
| Chemical | Mix No. | 7-day | 14-day | 28-day |
| Control | 1 | 4691 | 5293 | 5603 |
| KCl | 18 | 4677 | 5163 | 5588 |
| KCl | 19 | 4894 | 5352 | 5883 |
| KCl | 20 | 4583 | 5151 | 5494 |

EXAMPLE 2

A number of concrete mixes were prepared according to standard methods and allowed to harden at −5° C. The compressive strength, measured in pounds per square inch (psi) of each of the mixes was determined in 7-day, 14-day and 28-day intervals. The results of these tests are summarized in the accompanying table 2. Referring to table 2, a control mix, of standard Portland cement, identified as Mix No. 1, contained no admixture. The compressive strength of the control mix was 377 psi at 28 days. Three mixes containing the admixture in accordance with the invention, i.e., sodium nitrate to sodium sulfate in a ratio equal to 3:1 by weight (identified in the table KCl) were prepared in dosages of, respectively 2%, 6% and 8% by weight of cement added to the control mix. These three mixes are identified in the table as Mix Nos. 18, 19 and 20, Respectively, and had compressive strengths of 1926, 5032 and 4838 psi, respectively at 28 days. As is thus seen, there was a significant advantageous effect of the admixture dosed concrete when hardened at a temperature below freezind, particularly at a dosage of above 2%.

TABLE 2

| MIX | | COMPRESSIVE STRENGTH (psi) | | |
|---|---|---|---|---|
| Chemical | Mix No. | 7-day | 14-day | 28-day |
| Control | 1 | 103 | 183 | 377 |
| KCl | 18 | 1589 | 1699 | 1926 |
| KCl | 19 | 3503 | 4347 | 5032 |
| KCl | 20 | 3489 | 4286 | 4838 |

CURING TEMPERATURE: +20° C.

EXAMPLE 3

A number of concrete mixes were prepared according to standard methods and allowed to harden at −10° C. The compressive strength, measured in pounds per square inch (psi) of each of the mixes was determined in 7-day, 14-day, and 28-day intervals. The results of these tests are summarized in the accompanying table 3. Referring to table 3, a control mix, of standard Portland cement, identified as Mix No. 1, contained no admixture. The compressive strength of the control mix was 189 psi at 28 days. Three mixes containing the admixture in accordance with the invention, i.e., sodium nitrate to sodium sulfate in a ratio equal to 3:1 by weight (identified in the table as KCl) were prepared in dosages of, respectively 2%, 6%, and 8% by weight of cement added to the control mix. These three mixes are identified in the table as Mix Nos. 18, 19 and 20, respectively, and had compreseive strengths of 797, 3065 and 3999 psi, respectively at 28 days. As is thus seen, there was a significant advantageous effect of the admixture dosed concrete when hardened at a temperature below freezing, particularly at a dosage of above 2%

TABLE 3

| MIX | | COMPRESSIVE STRENGTH (psi) | | |
|---|---|---|---|---|
| Chemical | Mix No. | 7-day | 14-day | 28-day |
| Control | 1 | 58 | 80 | 189 |
| KCl | 18 | 518 | 706 | 797 |
| KCl | 19 | 2072 | 2602 | 3065 |
| KCl | 20 | 2635 | 3791 | 3999 |

CURING TEMPERATURE: −10° C.

EXAMPLE 4

A number of concrete mixes were prepared according to standard methods and allowed to harden at −20° C. The compressive strength, measured in pounds per square inch (psi) of each of the mixes was determined at 7-day, 14-day, and 28-day intervals. The results of these tests are summarized in the accompanying table 4. Referring to table 4, a control mix, of standard Portland cement, identified as Mix No. 1, contained no admixture. The compressive strength of the control mix was 106 psi at 28 days. Three mixes containing the admixture in accordance with the invention, i.e., sodium nitrate to sodium sulfate in a ratio equal to 3:1 by weight (identified in the table as KCl) were prepared in dosages of, respectively 2%, 6%, and 8% by weight of cement added to the control mix. These three mixes are identified in the table as Mix Nos. 18, 19, and 20 respectively, and has compressive strengths of 21, 603, and 652 psi, respectively at 28 days. As is thus seen, there was some advantage effect of the admixture dosed concrete when hardened at a temperature below freezing, particularly at a dosage of above 2%.

TABLE 4

| MIX | | COMPRESSIVE STRENGTH (psi) | | |
|---|---|---|---|---|
| Chemical | Mix No. | 7-day | 14-day | 28-day |
| Control | 1 | N/A | N/A | 106 |
| KCl | 18 | 0 | 16 | 21 |
| KCl | 19 | 384 | 408 | 603 |
| KCl | 20 | 189 | 409 | 652 |

CURING TEMPERATURE: −20° C.

It will be understood that, while preferred embodiments of the invention have been illustrated and described in detail, changes and additions may be had therein and thereto without departing from the spirit of the invention. Reference should, therefore, be had to the appended claims in determining the true scope of the invention.

What is claimed is:

1. An admixture for concrete consisting of:
   a) sodium nitrate; and
   b) sodium sulfate, wherein said sodium nitrate and said sodium sulfate are combined with one another in a ratio of sodium nitrate to sodium sulfate of 3:1.

2. A concrete mixture consisting of:
   a) concrete;
   b) water; and
   c) an antifreeze admixture consisting of sodium nitrate and sodium sulfate in a ratio of sodium nitrate to sodium sulfate of 3:1 and wherein the admixture is present in the amount of from 2% to 8%, by weight of the mixture.

3. A method of casting concrete comprising the steps of:
   a) preparing a concrete mixture consisting of concrete, water, and an antifreeze admixture consisting of sodium nitrate and sodium sulfate in a ratio of sodium nitrate to sodium sulfate of 3:1, wherein said antifreeze admixture is present in the amount of from 2% to 8%; and
   b) hardening said concrete mixture into a form.

4. The method of claim 3 wherein the steps take place without freezing of said concrete mixture.

* * * * *